Figure 1:
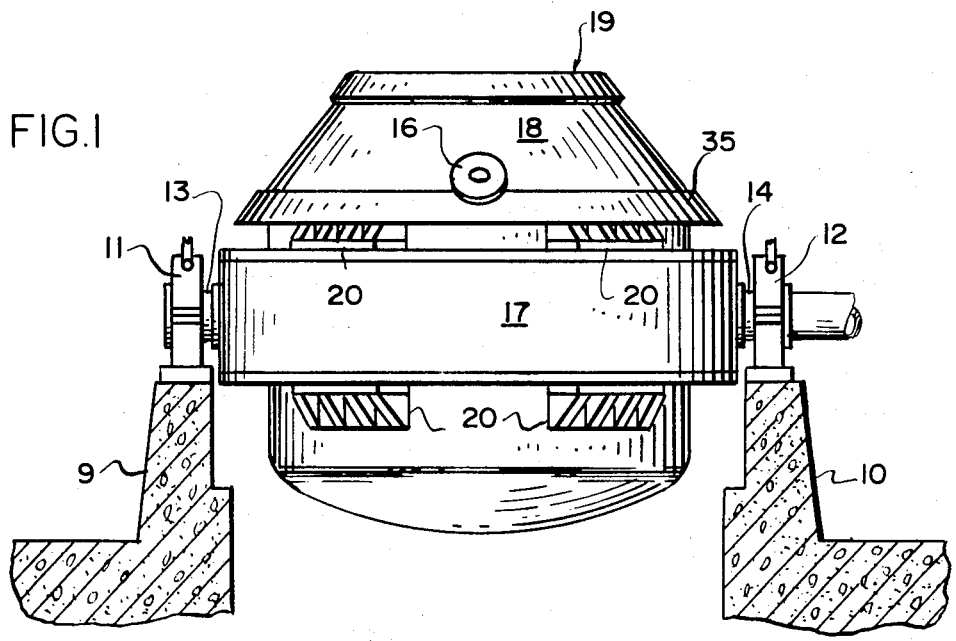

United States Patent

Langmead et al.

[11] 3,713,638
[45] Jan. 30, 1973

[54] CONVERTER VESSEL WITH OVAL TRUNNION RING

[75] Inventors: Edmund Clarence Langmead, Glen Ellyn; Gerald DeWane, Chicago, both of Ill.

[73] Assignee: Chicago Bridge & Iron Company, Oak Brook, Ill.

[22] Filed: Dec. 2, 1970

[21] Appl. No.: 94,281

[52] U.S. Cl. .............................. 266/36 P, 263/33 A
[51] Int. Cl. ................................................ C21c 5/50
[58] Field of Search ............... 266/36 P; 263/33 A

[56] References Cited

UNITED STATES PATENTS

| | | | |
|---|---|---|---|
| 3,503,599 | 3/1970 | Jansa et al. | 266/36 P |
| 3,502,314 | 3/1970 | Puhringer | 266/36 P |
| 3,197,187 | 7/1965 | Lakin et al. | 266/36 P |
| 3,358,984 | 12/1967 | Grassin et al. | 266/36 P |

Primary Examiner—J. Spencer Overholser
Assistant Examiner—John E. Roethel
Attorney—Merriam, Marshall, Shapiro & Klose

[57] ABSTRACT

A trunnion ring and the combination of the trunnion ring and a converter vessel, such as for steel-making, supported or mounted therein. The trunnion ring has an oval, i.e. oblong or elliptical-like, opening in which a vessel is mounted. The minor axis of the oval is in line with the trunnions and the major axis is in line with the charge-side and tap side of a vessel. With the oval trunnion ring, rather than a circular trunnion ring, greater clearance between the vessel wall and the trunnion ring is provided initially or preservice in the direction in which the vessel will enlarge from thermal stresses. When such growth occurs there will still be adequate air space between the vessel wall and trunnion ring for air cooling to avoid over-heating the trunnion ring.

2 Claims, 2 Drawing Figures

PATENTED JAN 30 1973  3,713,638

INVENTORS.
EDMUND C. LANGMEAD
GERALD DEWANE

BY Merriam, Marshall, Shapiro &
Klose.

ATTORNEYS.

CONVERTER VESSEL WITH OVAL TRUNNION RING

This invention relates to mountings for invertible vessels, such as converter vessels used in the oxygen process of steel-making, and more particularly to a mounting which accommodates for horizontal thermal distortion of the vessel relative to its mounting.

Converters used in the oxygen steel-making process generally comprise an open-top vessel, a peripheral ring or trunnion ring connected to the vessel and spaced radially therefrom to accommodate thermal expansion of the vessel in a radial direction, a pair of trunnions extending in opposite directions from the ring, and a pair of bearings mounted on foundation pedestals for rotatably mounting said trunnions. The converter vessel is connected to the trunnion ring by suitable brackets which permit unitary rotation of the trunnion ring-converter vessel combination.

Trunnion rings normally used have a circular opening larger than the circular periphery of the vessel adjacent the trunnion ring thereby providing a radial clearance between the vessel and trunnion ring around the vessel. This clearance is essentially uniform when a new preservice trunnion ring-vessel combination is put in service. The clearance is usually about six inches but can be more or less than this. The purpose of the clearance is to provide an air space to reduce heat transfer from the vessel to the trunnion ring to avoid over-heating, and weakening, of the trunnion ring.

Through use of the vessel, thermal effects cause the vessel to permanently enlarge. This expansion is particularly significant adjacent to the trunnion sing since it reduces the air space clearance between the vessel and the trunnion ring. The expansion however is not uniform. The enlargement of the vessel is generally mostly in a direction horizontal but normal to the trunnion axis. The vessel thus becomes oval shaped in horizontal section. Those areas of the enlarged vessel made closer to the trunnion ring as a result of the expansion cause increased heating of those portions of the trunnion ring adjacent thereto. This is an undesirable condition. The present invention provides a novel trunnion ring and trunnion ring-vessel combination which minimizes or eliminates this problem and provides other advantages which will be described herein or which will be obvious to those skilled in the art.

There is provided according to the present invention a novel trunnion ring and the combination of the trunnion ring and a vessel supported or mounted therein.

The trunnion ring has an oval, i.e., oblong or elliptical-like, opening in which a vessel can be mounted. The minor axis of the oval is essentially in line with the trunnions and the major axis is essentially in line with the charge-side and tap side of a vessel to be mounted in the ring. By providing an oval trunnion ring, rather than a circular trunnion ring, greater clearance between the vessel wall and the trunnion ring is provided initially or preservice in the direction in which the vessel will permanently expand or enlarge from thermal effects so that when such growth occurs there will still be adequate clearance between the vessel wall and trunnion ring at all adjacent locations between them.

The trunnion ring, more specifically, has a pair of trunnions mounted to the ring in aligned but opposite position to one another. The trunnion ring has a preservice inner peripheral edge which defines an oval with the minor axis of the oval being axially in line with the trunnions and the major axis of the oval normal to the minor axis. The ring is adapted to support a vessel with a normally vertical axis and which is essentially circular in a horizontal section taken through the vessel adjacent the trunnion ring. The minor axis of the oval is longer than the vessel diameter and the vessel axis intersects the intersection of the oval minor axis and major axis. The result is an air gap or clearance distance between the edge of the trunnion ring and a vessel placed therein, completely therearound. The clearance distance is always no less than the clearance between the vessel and the trunnion ring along the minor axis of the oval. Advisably, the preservice clearance between the trunnion ring and a vessel which the trunnion ring is adapted to receive, taken along the line of the major axis of the oval, is at least 50 percent greater than the preservice clearance between the trunnion ring and the vessel taken along the line of the minor axis of the oval.

Figure 2:
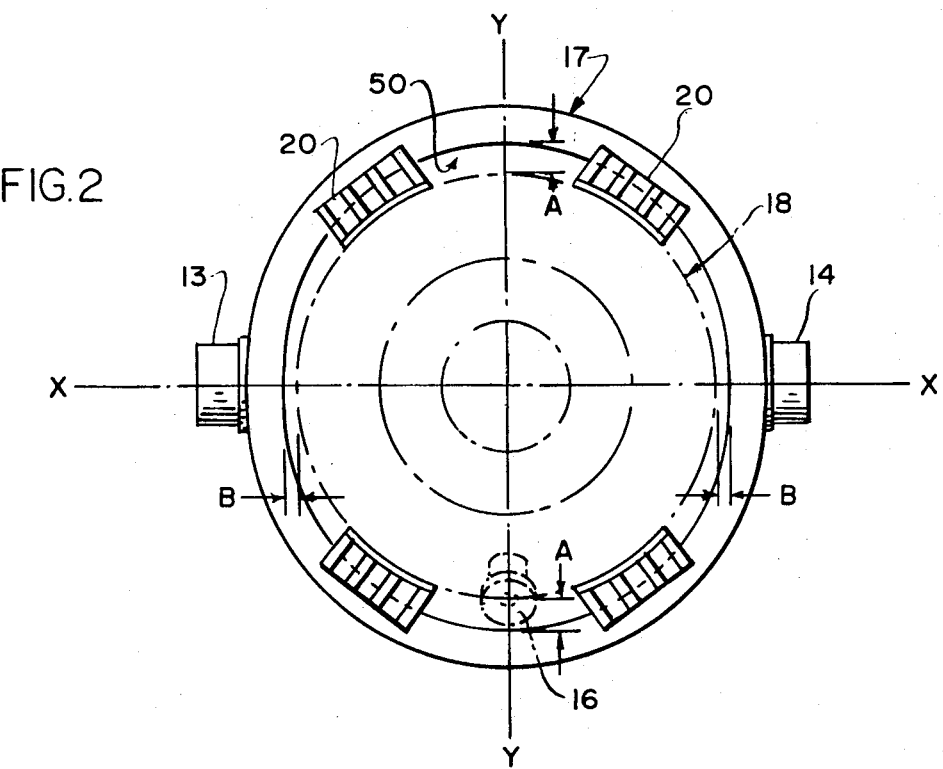

The invention will now be described further in conjunction with the attached drawings in which:

FIG. 1 is a front elevational view, partly in section, of a steel-making converter including a trunnion ring of the invention having a converter vessel mounted therein; and, FIG. 2 is a plan view of the converter of FIG. 1 with considerable structural detail eliminated to better illustrate the novel trunnion ring and a vessel mounted therein.

With reference to the drawings, vessel 18 has an upper opening 19 and a tap-hole nozzle 16. The vessel 18 is connected to trunnion ring 17 by a plurality of peripherally spaced brackets 20. Extending outwardly from ring 17 in opposite directions is a pair of horizontal trunnions 13, 14 journalled in bearings 11, 12 supported by foundation pedestals 9, 10. Trunnion 14 is connected to means (not shown) for rotating the trunnions and inverting the vessel 18. Outwardly flaring shield 35 is connected to the shell of vessel 18 to protect the mechanism mounting the vessel to the trunnion ring. Such a mounting mechanism is disclosed in U.S. Pat. No. 3,191,921.

As shown more clearly in FIG. 2, the vessel 18 is essentially circular in horizontal cross-section and its vertical axis passes through the point of intersection of axes XX and YY. Axis XX is the minor axis of the oval opening 50 in trunnion ring 17 and coincides with the axis of trunnions 13 and 14. The clearance between vessel 18 and the internal edge of the trunnion along the minor axis XX is shown as the distance B on each opposite side of the vessel. This distance is normally about six inches before the vessel and trunnion ring are put in service. Axis YY is the major axis of the oval opening in trunnion ring 17. The clearance between vessel 18 and the internal edge of the trunnion along the major axis YY is shown as the distance A on each opposite side of the vessel. The distance A is predetermined to constitute the sum of the enlargement of the vessel on one adjacent side plus the distance B so that the result of inservice enlargement of the vessel a clearance of about the distance B will remain all around the vessel between it and the edge of the trunnion ring. Generally, the distance A is at least 50 percent greater than the distance B. Thus, if B is 6 inches, then A should be at least 9 inches although it can readily be 12 inches or more. The shape of the oval opening furthermore should advisably provide a preservice clearance all around the vessel no less than the distance B with all other clearances therearound being no less than this minimum even at brackets 20.

The described oval trunnion ring can be used new with a new vessel or a vessel which has been service. Also, the trunnion ring can be used in service and then used thereafter with a new vessel.

The oval trunnion ring provided herewith permits growth of the vessel during service and yet provides sufficient clearance or air gap between the ring and the vessel to avoid structural failure due to excessive thermal stress in the trunnion ring. In addition, the vessel shell life is prolonged since it need not be replaced as in the past when vessel expansion brought it into close contact with a circular trunnion ring.

We claim:

1. A trunnion ring having a pair of trunnions mounted to the ring in aligned but opposite position to one another;
   the trunnion ring having a preservice inner peripheral edge which defines an oval with the minor axis of the oval being axially in line with the trunnions and the major axis of the oval normal to the minor axis;
   the trunnion ring being adapted to support a vessel with a normally vertical axis and essentially circular in a horizontal section taken through the vessel adjacent the trunnion ring;
   the minor axis of the oval being longer than the vessel diameter and with the vessel axis intersecting the intersection of the oval minor axis and major axis, thereby providing a preservice clearance distance between the edge of the trunnion ring and a vessel which the trunnion ring is adapted to receive completely therearound taken along the line of the major axis of the oval which is at least 50 percent greater than the preservice clearance between the trunnion ring and the vessel taken along the line of the minor axis of the oval, said clearance distance always being no less than the clearance between the vessel and the trunnion ring along the minor axis of the oval.

2. In combination, a vessel, a trunnion ring having a pair of trunnions opposite each other and means to support the vessel in the trunnion ring;
   the trunnion ring having a preservice inner peripheral edge which defines an oval with the minor axis of the oval being axially in line with the trunnions and the major axis of the oval normal to the minor axis;
   the trunnion ring supporting the vessel with the vessel axis vertical, the vessel being essentially circular in a horizontal section taken through the vessel adjacent the trunnion ring;
   the minor axis of the oval being longer than the vessel diameter and with the vessel axis intersecting the intersection of the oval minor axis and major axis, thereby providing a preservice clearance distance between the edge of the trunnion ring and the vessel completely therearound taken along the line of the major axis of the oval which is at least 50% greater than the preservice clearance between the trunnion ring and the vessel taken along the line of the minor axis of the oval, said clearance distance always being no less than the clearance between the vessel and the trunnion ring along the minor axis of the oval.

* * * * *

UNITED STATES PATENT OFFICE
CERTIFICATE OF CORRECTION

Patent No. 3,713,638      Dated February 13, 1973

Inventor(s) EDMUND CLARENCE LANGMEAD and GERALD DE WANE

It is certified that error appears in the above-identified patent and that said Letters Patent are hereby corrected as shown below:

Column 1, line 33, "sing" should be --ring--.

Column 2, line 63, "the result" should be --as a result--.

Column 3, line 8, "been" should be --seen--.

Signed and sealed this 29th day of May 1973.

(SEAL)
Attest:

EDWARD M. FLETCHER, JR.
Attesting Officer

ROBERT GOTTSCHALK
Commissioner of Patents